United States Patent Office.

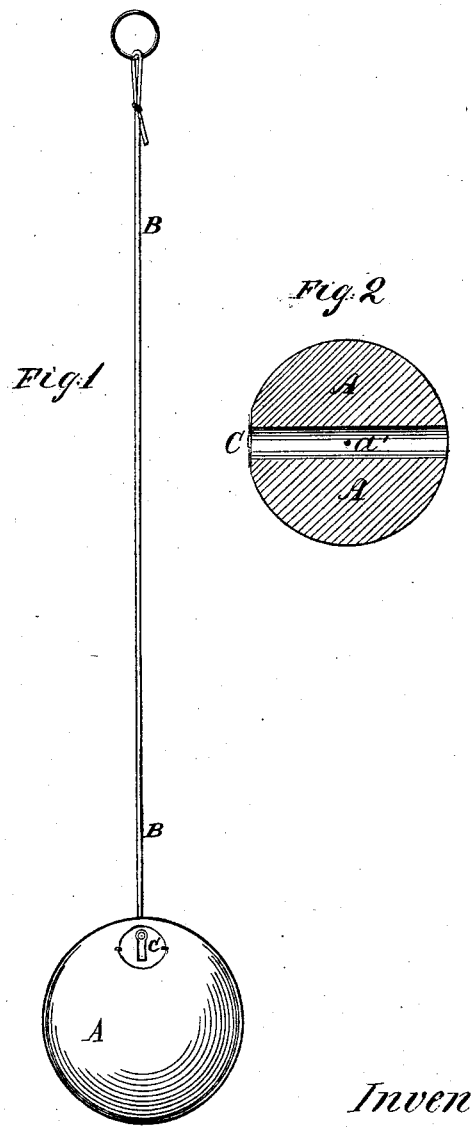

JOHN BURKE, OF BROOKLYN, NEW YORK.

Letters Patent No. 76,396, dated April 7, 1868.

MUSICAL RETURN-BALL.

The Schedule referred to in these Letters Patent and making part of the same.

TO ALL WHOM IT MAY CONCERN:

Be it known that I, JOHN BURKE, of Brooklyn, in the county of Kings, and State of New York, have invented a new and improved Combined Musical Reed and Return-Ball; and I do hereby declare that the following is a full, clear, and exact description thereof, which will enable others skilled in the art to make and use the same, reference being had to the accompanying drawings forming a part of this specification, in which—

Figure 1 is a side view of a return-ball, illustrating my improvement.

Figure 2 is central section of the same.

Similar letters of reference indicate corresponding parts.

My invention has for its object to furnish an improved toy for children, which shall be so formed as to combine two toys in one, without affecting the efficiency of either, and it consists in the combination of an ordinary musical reed with an ordinary return-ball, as hereinafter more fully described.

A is an ordinary return-ball, made of wood, and having an India-rubber or other elastic cord, B, attached to it in the ordinary manner. The ball A is perforated through its centre, as shown in fig. 1. To the ball, at one end of the hole or perforation $a'$, is attached a small circular plate, having a reed, C, attached to it in the ordinary manner, so that by drawing or blowing the breath through the perforation $a'$ of the ball A, musical sounds may be produced. The part of the hole $a'$ in which the reed C is placed is immaterial; that is to say, the plate to which the reed C is attached may be at the end of the hole $a'$, at the surface of the ball A, as shown in the drawings, or it may be sunk into the said ball so as to be at any desired distance within said surface, so as to be wholly protected from injury by an accidental blow.

Having described my invention, I claim as new, and desire to secure by Letters Patent—

As a new article of manufacture, a return-ball, A B, having a perforation, $a'$, in which a musical reed, C, is placed, as described.

The above specification of my invention signed by me, this 3d day of February, 1868.

JOHN BURKE.

Witnesses:
    WM. F. MCNAMARA,
    JAMES T. GRAHAM.